(12) United States Patent
Kiser (10) Patent No.: US 10,757,910 B2
(45) Date of Patent: Sep. 1, 2020

(54) ANIMAL LITTER BOX APPARATUS

(71) Applicant: Margaret Ligon Kiser, Royal Palm Beach, FL (US)

(72) Inventor: Margaret Ligon Kiser, Royal Palm Beach, FL (US)

(*) Notice: Subject to any disclaimer, the term of this patent is extended or adjusted under 35 U.S.C. 154(b) by 202 days.

(21) Appl. No.: 16/034,421

(22) Filed: Jul. 13, 2018

(65) Prior Publication Data

US 2020/0015448 A1   Jan. 16, 2020

(51) Int. Cl.
*A01K 1/01*   (2006.01)

(52) U.S. Cl.
CPC .................................. *A01K 1/011* (2013.01)

(58) Field of Classification Search
CPC .... A01K 1/0107; A01K 1/011; A01K 1/0114; A01K 1/015; A01K 1/0152
USPC ........... 119/161, 165–170; 206/91, 267, 758; 220/4.32, 543, 544
See application file for complete search history.

(56) References Cited

U.S. PATENT DOCUMENTS

| | | | |
|---|---|---|---|
| 5,272,999 A * | 12/1993 | Nussle | A01K 1/0114 119/166 |
| 5,325,815 A | 7/1994 | Gumpesberger | |
| 5,507,248 A | 4/1996 | Gabbert | |
| 5,755,182 A | 5/1998 | Brown, Jr. et al. | |
| 5,797,346 A | 8/1998 | Lewis | |
| 6,135,058 A | 10/2000 | Jaeger | |
| 6,202,595 B1 * | 3/2001 | Atcravi | A01K 1/0114 119/165 |
| 6,941,894 B2 | 9/2005 | D'Anielo | |
| 2008/0314328 A1 | 12/2008 | Johnson | |
| 2014/0076756 A1 * | 3/2014 | Sweetman | A01K 1/011 206/349 |
| 2015/0122189 A1 * | 5/2015 | Sweetman | A01K 1/0107 119/165 |

* cited by examiner

*Primary Examiner* — Peter M Poon
*Assistant Examiner* — Danielle A Clerkley
(74) *Attorney, Agent, or Firm* — Glenn E. Gold, P.A.; Glenn E. Gold (57) ABSTRACT

An animal litter box apparatus includes a main body having a base and vertical sides. A main body front side has a dual-walled construction including an exterior wall, a spaced-apart interior wall, and an upper edge adjoining upper ends of the interior and exterior walls to define an interior storage space. A compound opening is defined by respective cut-out portions of the interior wall, exterior wall, and the upper edge. A magnetic coupling element within the interior storage space cooperates with a corresponding magnet on a litter-sifting basket of a litter scoop to selectively retain the litter scoop basket therein. A recessed portion of the exterior surface of the exterior wall accommodates a proximal end portion of the litter scoop handle. An inverted U-shaped cover member disposed about the front side is slidable from an open position to a closed position to discreetly house the entire litter scoop.

19 Claims, 11 Drawing Sheets

ANIMAL LITTER BOX APPARATUS

FIELD OF THE INVENTION

The present invention pertains generally to animal litter boxes, such as cat litter boxes. More particularly, the present invention relates to an improved animal litter box apparatus configured and constructed to accommodate selective engagement with an animal waste scooper, or sifting device, such that a waste collection basket portion of the scooper can be selectively contained within an interior litter box space, and a handle length of the scooper similarly concealed by a slidable cover, while the scooper is stowed when not being used.

BACKGROUND OF THE INVENTION

Conventionally, animal waste is removed from an animal litter box (e.g. a cat litter box) using an animal litter scoop. These scoops are used to remove waste products or other debris from an animal's litter box regularly, to ensure a clean environment for the animal and to minimize waste odors. The scoops, used to sift through litter to collect animal waste, often become covered with litter, dust, and animal waste. Such contaminated waste removal scoops are very unsanitary, to both the user and the animal, not to mention being very unsightly when left exposed—typically adjacent to the litter box. Users of conventional animal litter boxes find it difficult to locate places to discretely store a scoop in a convenient location near the litter box. Conventional litter boxes have a very basic unitary, or one-piece, plastic molded pan-like structure comprised of a flat, or planar, bottom/base with a contiguous upwardly-extending peripheral sidewall (e.g. a rectangular base having four adjoining vertical side walls). Consequently, users' options are generally limited to either washing/cleaning the scoop after each use, or simply living with the odor emanating from the exposed unclean scoop.

Placing the scooper on the floor surface alongside the litter box is not only an eyesore, but remnants left attached to the scoop basket often detach and drop to the floor, which is very unsanitary. Furthermore, with regard to cat litter boxes, it is not uncommon for cats to urinate upon an exposed litter scoop. Hanging the scooper on a hook outside of the litter box is not an acceptable approach since it is also an eyesore, emits an undesirable odor, results in unsanitary waste and litter falling to the underlying floor, and leaves the scooper accessible to the cat (or other animal). Placing the scooper in the litter box main area with the basket buried in the litter to support the scooper in an orientation with the handle extending upward (or in a separate area divided by a wall, or similar structure, from the main litter box area suffers from many of the same issues (e.g. accessible to the animal, enabling the scooper to be compromised by the animal).

One known approach to addressing this issue is through the use of disposable litter scoops. However, when users simply throw the scoops away instead of cleaning them, they incur the cost of a replacement scoop. Some litter boxes consist of both a litter pan and a lid covering the pan, wherein the lid typically includes a relatively large opening through which the animal is able to enter and exit the litter box. In such cases, the litter scoop could be retained within the interior space formed by the lid-covered pan; however, this still leaves the scoop in an exposed position where it is accessible to the animal. Furthermore, even if the scoop was retained within the interior space in a manner preventing such undesirable contact with the animal, this would not solve the problem of foul odors from the scoop escaping through the litter box entry/exit opening. Furthermore, this would also make user-access to the scoop very inconvenient.

In light of the aforementioned drawbacks, disadvantages and limitations associated with known animal litter boxes, it would be highly desirable to provide an animal litter box apparatus, including a litter box main body incorporating means for temporarily engaging and retaining a corresponding litter scoop, when the scoop is not being used, such that the entire scoop remains discreetly stored out-of-view, and wherein the basket portion of the scoop is contained within an interior structure of the litter box such that odor emitted from the basket is correspondingly contained, thereby minimizing the egress of any such odors beyond the interior area, and further ensuring that any undesirable remnants or remains detaching from the basket portion fall back into the interior of the litter box.

It would be even more desirable to provide such an animal litter box apparatus wherein, when the litter scoop is in a stored position, a handle portion of litter scoop is discreetly retained exteriorly of the litter box, and wherein the interior structure for containing the basket portion of the scoop could be easily selectively accessed by a user when removing the scoop during use and when returning the scoop for storage in between uses.

BRIEF SUMMARY OF THE INVENTION

The present disclosure is generally directed to an animal litter box apparatus, including a main body including a base and a plurality of sides extending vertically upwards from a periphery of the base, at least one of the sides having a dual-walled construction at least partially defined by an exterior wall, an interior wall spaced-apart from the exterior wall, and an upper edge adjoining upper ends of the interior and exterior walls. Together, the interior wall, the exterior wall, and the upper edge define a first interior storage space. A compound opening is formed by an exterior wall cut-out, an interior wall cut-out, and an upper edge cut-out adjoining the interior and exterior wall cutouts. A first half of a coupling system extends interiorly from an interior surface of the exterior wall. A unitary cover member seated about the dual-walled side has spaced-apart exterior and interior vertically-disposed sidewalls adjoined at respective upper ends thereof by, and contiguous with, a cover member top side, the cover member disposed about respective exterior surfaces of the exterior wall, interior wall, and upper edge such that the cover member is slidably translatable along a length of the side between an opened position and a closed position, wherein the first interior storage space is accessible when the cover member is in the opened position and the first interior storage space is completely enclosed when the cover member is in the closed position.

In an aspect of the invention, the animal litter box apparatus may incorporate a litter scoop having a handle, which may be linear or non-linear, including a handle length at a proximal end thereof and a litter-sifting basket portion at an opposite distal end thereof, the litter scoop having a second half of the coupling system integrated therewith, the second half of the coupling system releasably attachable to the first half of the coupling system, thereby enabling selective releasable coupling of the litter scoop to the interior surface of the exterior wall of the dual-walled side.

In another aspect, the first half of the coupling system and the second-half of the coupling system may be magnetically-attractable components.

In another aspect, the first half of the coupling system and the second half of the coupling system may, alternatively, incorporate a mechanical snap-fit coupling system or a hook-and-loop type coupling system.

In another aspect, an exterior surface along a length of the exterior wall of the dual-walled side may incorporate an inwardly contoured surface portion.

In another aspect, the exterior surface along the length of the exterior wall of the dual-walled side may incorporate a recessed surface portion conforming to an exterior surface of the scoop handle, the recessed portion sized, shaped, and otherwise configured to receive the handle length such that, in the closed position, the sliding cover remains completely unimpeded by the handle length, such that in the closed position the sliding cover completely conceals the recessed portion of the exterior surface of the exterior wall and a scoop handle received therein.

In another aspect, the unitary cover member may include a mechanism for restricting upward movement of the unitary cover vis-à-vis the underlying at least one side.

In another aspect, the mechanism for restricting upward movement of the unitary cover may be inwardly-projecting features proximate lower ends of the unitary cover interior and exterior sidewalls, the inwardly-projecting features engaging the at least one sidewall in a manner enabling sliding of the unitary cover while restricting the upward movement of the cover vis-à-vis the at least one side.

In another aspect, an additional side may be provided having a dual-walled construction at least partially defined by an exterior wall, an interior wall spaced-apart from the exterior wall, and an upper edge adjoining upper ends of the interior and exterior walls, the interior wall, the exterior wall, and the upper edge, together, defining an interior space, the additional dual-walled side including: an aperture extending completely through the upper edge; a cover sized and shaped to selectively seal the aperture, the cover attached to the upper edge by a living hinge; and a structure contained within the interior space, the structure depending downwardly from an interior surface of the upper edge to define a secondary interior storage space.

In another aspect, the secondary interior storage space may be sized and shaped to snugly receive an item-dispensing container therein, wherein a dispensing top of the container is positioned proximate to the upper edge aperture when the container is fully seated within the secondary interior storage space.

In another aspect, the item-dispensing container may be a waste bag-dispensing container.

In another aspect, the waste bag-dispensing container may include: a cylindrical housing having an interior space; a compact contiguous roll of waste bags contained within the interior space of the cylindrical container; and a dispensing cap seated within an upper opening of the cylindrical housing, the dispensing cap configured to facilitate removal of individual bags of the contiguous roll of waste bags.

These and other features, aspects, and advantages of the invention will be further understood and appreciated by those skilled in the art by reference to the following written specification, claims and appended drawings.

BRIEF DESCRIPTION OF THE SEVERAL VIEWS OF THE DRAWINGS

The invention will now be described, by way of example, with reference to the accompanying drawings, where like numerals denote like elements and in which.

Like reference numerals refer to like vas throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-8, an animal litter box apparatus, identified generally by reference numeral 10, is shown in accordance with a first exemplary implementation of the present invention. The apparatus includes a litter box main body 12, broadly defined by a bottom side, or base 34, having a plurality of sides 15, 19, 23 and 27, extending vertically upwards from a base periphery 32 (shown in FIG. 1). Initially, it should be noted that in the accompanying drawing figures, the exemplary animal litter box main body 12 is shown having four dual-walled, or double-walled, sides. However, the present invention may incorporate a single double-walled (or hollow) side, with the remaining sides each having a single-walled structure. In other words, it is only necessary that at least one of the sides incorporates a double-walled structure. Furthermore, although the exemplary animal litter box main body 12 is shown having a four-sided rectangular geometry, it will be readily apparent to those skilled in the art that the present invention could employ a variety of different shapes and geometries, without departing from the intended scope of the invention. For the sake of convenience and clarity, the main body sides will be referenced herein as front side 27, left side 15, rear side 19, and right side 23.

Figure 1:
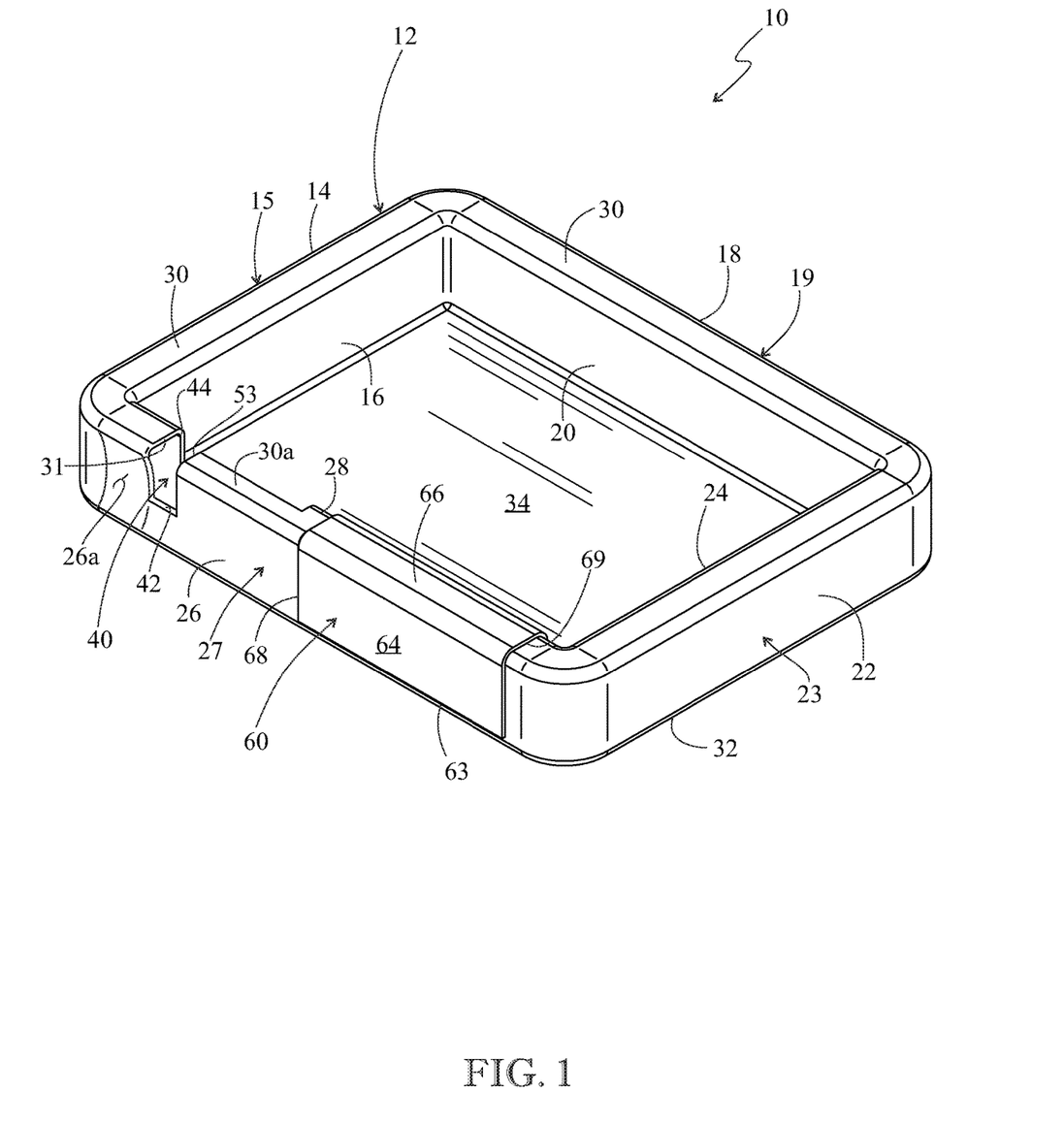
FIG. 1 is a top-front-right isometric view of an animal litter box apparatus (10) with a litter scoop-receiving portion shown in an open state for receipt of a litter-sifting scoop (not shown in FIG. 1, but introduced in FIG. 3)

Left side 15 is further defined by a left side exterior wall 14, a left side interior wall 16 spaced-apart therefrom, and peripheral upper edge 30 adjoining the left side exterior and interior walls at their respective upper ends. Rear side 19 is further defined by a rear side exterior wall 18, a rear side interior wall 20 spaced-apart therefrom, and peripheral upper edge 30, adjoining the rear side exterior and interior walls at their respective upper ends. Right side 23 is further defined by a right side exterior wall 22, a right side interior wall 24 spaced-apart therefrom, and peripheral upper edge 30 adjoining the right side exterior and interior walls at their respective upper ends. Front side 27 is further defined by a front side exterior wall 26, a front side interior wall 28 spaced-apart therefrom, and peripheral upper edge 30 adjoining the front side exterior and interior walls at their respective upper ends. However, the structure of front side 27 is not uniform along its entire length.

Significantly, for example, front side 27 incorporates a compound opening formed by a series of contiguous cut-outs, or removed sections, in exterior wall 26, interior wall 28, and peripheral edge 30 adjoining exterior wall 26 and interior wall 28. As a result of the compound opening section cut-outs a slot 40 is created extending completely through side 27, which, as described further hereinbelow, facilitates insertion of litter scoop 80 during the process of discreetly storing the scoop. The compound opening section cut-outs further result in the formation of a reduced-width peripheral edge portion 30*a* adjacent to, and extending to the right of, slot 40 created by the compound opening. Furthermore, exterior wall 26 incorporates an inwardly-contoured portion 26*a* adjacent to, and extending left of, slot 40 created by the compound opening. Alternatively stated, slot 40 is partially bounded on its right by front side exterior wall 26 and on its left side by inwardly-contoured portion 26*a* of front side exterior wall 26. In the accompanying figures, the inwardly-contoured portion 26*a* is shown having a generally smooth concave geometry. However, inwardly contoured portion 26*a* may be provided in alternate forms. For example, for purposes that will become more readily apparent upon further reading of this specification, inwardly-contoured portion 26*a* may be provided in the form of a recessed portion sized, shaped, and otherwise configured to conform to the exterior surface geometry of a gripping handle length 82 of a litter scoop 80 employed in connection with the present invention (e.g. as shown in FIGS. 3-6 and 8-10).

Figure 2:
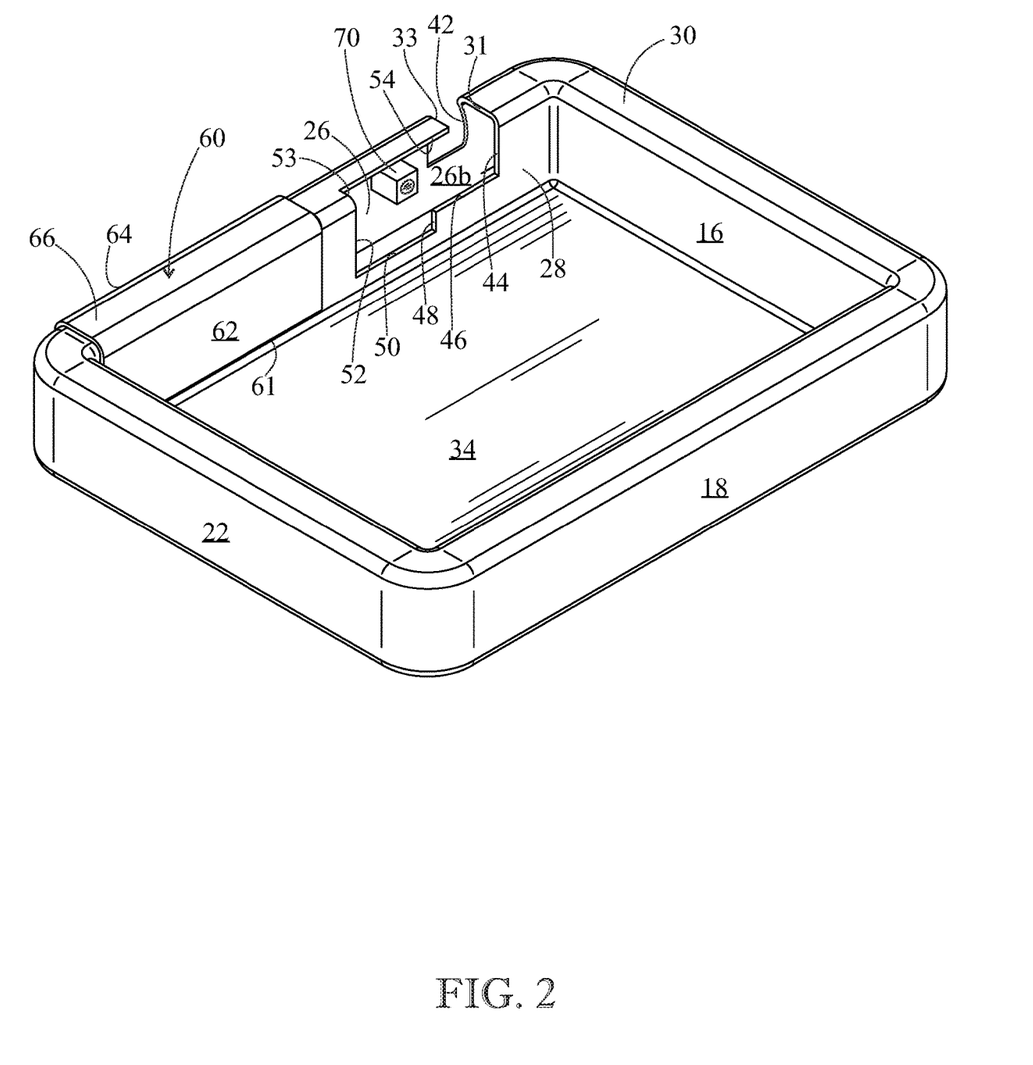
FIG. 2 is a top-rear-left isometric view of the animal litter box apparatus (10) shown in FIG. 1.

Referring now particularly to FIGS. 1-2, the cut-outs defining the compound opening in front side 27 will now be described in greater detail. The compound opening is formed by a combination of cut-outs in exterior wall 26 (including inwardly curved exterior wall portion 26*a*), peripheral upper edge 30, and interior wall 28. The cut-out in the exterior wall 26, 26*a* is defined by U-shaped cut-out 42. The cut-out in peripheral edge 30 is defined by edges 31, 33, 53 and 54. The cut-out in the interior wall 28 is defined by edges 44, 46, 48, 50 and 52.

Figure 3:
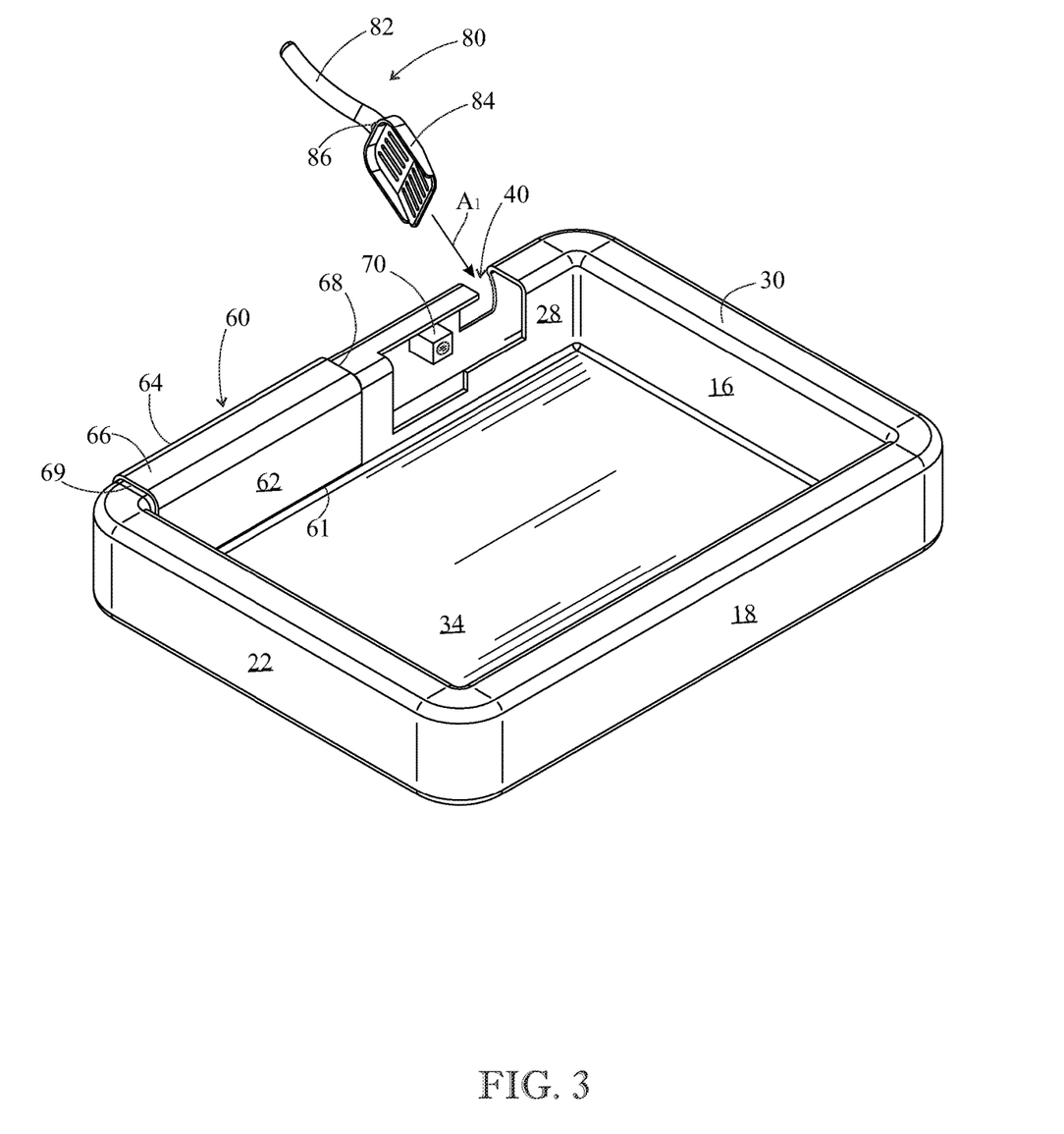
FIG. 3 is a top-rear-left isometric view of the animal litter box apparatus (10) introduced in FIG. 2, further showing a litter-sifting scoop (80) about to be received within the litter scoop-receiving portion (as indicated by the directional arrow)
Figure 4:
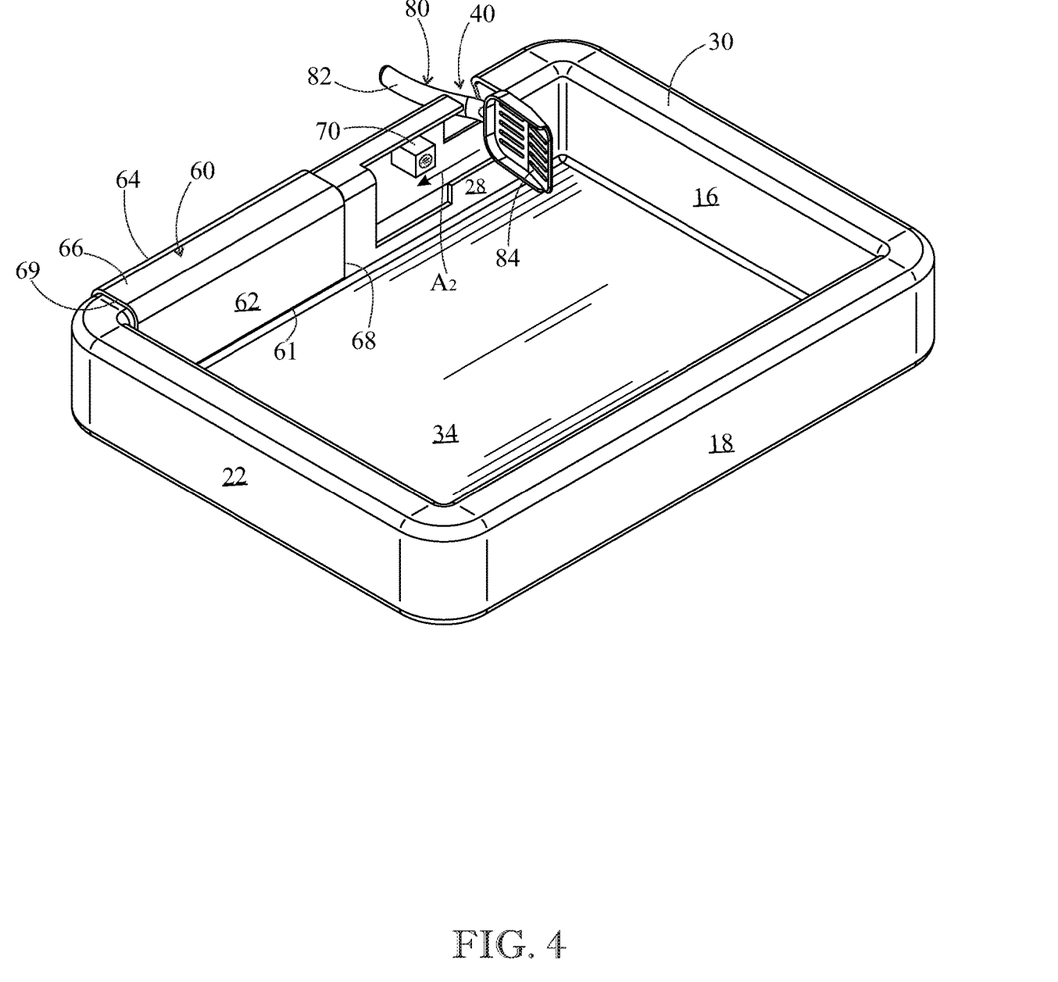
FIG. 4 is top-rear-left isometric view of the animal litter box apparatus (10), including the litter-sifting scoop (80) introduced in FIG. 3, showing a waste collection basket (84) of the litter-sifting scoop inserted completely through a litter scoop receiving slot, or opening (40), provided along the front side (26, 28) of the main body (12) of the litter box apparatus.

As best shown in FIGS. 3 and 4, a litter box main body magnet 70, functioning as the first-half of a magnetic coupling system, is provided on the interior surface 26*b* of exterior wall 26 of front side 27. As described in further detail herein, main body magnet 70 magnetically couples with a corresponding litter scoop magnet 86 along a distal end portion of handle 82 adjacent to litter-sifting basket portion 84 of litter scoop 80. Although a magnetic coupling system is preferred for temporarily securely retaining litter-sifting basket 84 (and an adjacent length of handle 82) of litter scoop 80 within the interior space created by the compound opening, alternative coupling systems may be employed without departing from spirit and scope of the present invention. For example, in lieu of a magnetic coupling system a mechanical snap-fit coupling system (or other structural-based coupling system) or a hook-and-loop type coupling system could be employed without departing from the intended scope of the invention.

Referring now to FIGS. 1-8, a unitary, or one-piece, cover member 60 is provided disposed about the front side 27 of litter box main body 12, and is generally defined by an interior sidewall 62, an exterior sidewall 64, and a top side 66 adjoining the interior and exterior sidewalls. Interior sidewall 62 depends downwardly from top side 66 and terminates at a lower edge 61. Likewise, exterior sidewall 64 depends downwardly from top side 66 and terminates at a lower edge 63. Horizontally, cover member 60 extends between a leading edge 68 and a trailing edge 69. Cover member 60 is particularly configured for sliding along front side 27. Preferably, cover member 60 is provided incorporating a mechanism for restricting upward movement of the cover member vis-à-vis peripheral upper edge portions, 30 and 30*a*, of front side 27. In that regard, it is preferred that respective lower portions of the interior and exterior sidewalls, 62 and 64, respectively, incorporate a slight inward taper (not shown) such that their respective lower edges, 61 and 63, engage recessed channels (not shown) provided along a lower portion of the exposed exterior surfaces of exterior and interior walls, 26 and 28, respectively.

Referring now particularly to FIGS. 3-8, the process for storing litter scoop 80 within the interior space exposed by the compound opening will now be described. As best shown in FIGS. 3 and 4, initially the litter-sifting basket portion 84 of litter scoop 80 is inserted (as indicated by directional arrow $A_1$) into slot 40 such that the basket portion 84 (optionally, along with a partial distal end portion of the handle length) extends into the interior of litter box main body 12, with most, if not all, of the length of handle 82 of litter scoop 80 extending exteriorly of the litter box main body.

Subsequently, as best shown by FIG. 4, the entire litter scoop 80 is rotated, in this case clockwise, and the litter-sifting basket portion 84 is translated, or moved (as indicated by directional arrow $A_2$) into and through the interior storage space defined, or exposed, by the compound opening formed by the cut-out sections of exterior wall 26, interior wall 28, and peripheral upper edge 30 (and 30a).

Figure 5:
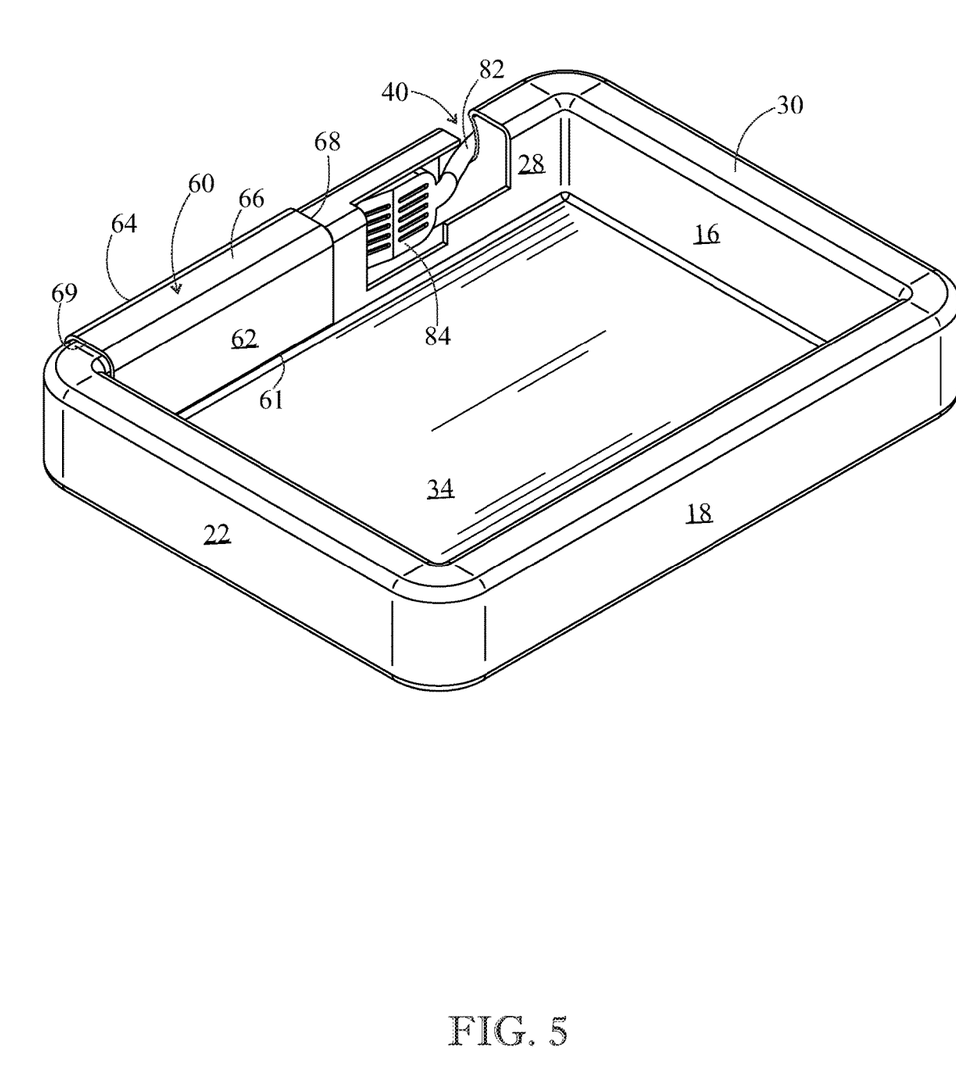
FIG. 5 is a top-rear-left isometric view of the animal litter box apparatus, including the litter-sifting scoop (80) shown after being rotated into a stowed state, wherein the waste collection basket (84) is completely received and maintained within a containment portion of the litter box main body (12), and the handle portion (82) of the litter-sifting scoop is positioned against an inwardly-contoured outer surface (26a) of the exterior wall (i) of the front side (27) of main body (12)

Subsequently, as best shown by FIG. 5, the litter scoop is positioned with litter scoop magnet 86 in general alignment with litter box main body magnet 70 until the magnetic attraction secures the litter scoop 80 in a fixed position within the interior space. Significantly, in this position, a partial length of the distal end of the scoop handle 82 adjacent to litter-sifting basket 84 may extend outwardly from the interior storage space, and a corresponding length of the scoop handle 82 is snugly received against the exterior surface of the inwardly-contoured portion 26a (FIG. 1) of exterior wall 26. Where inwardly-contoured portion 26a is provided in the form of a recess sized, shaped, and otherwise configured to conform to the shape, or geometry, of the scoop handle 82, the scoop handle is snugly received within the recess.

Figure 6:
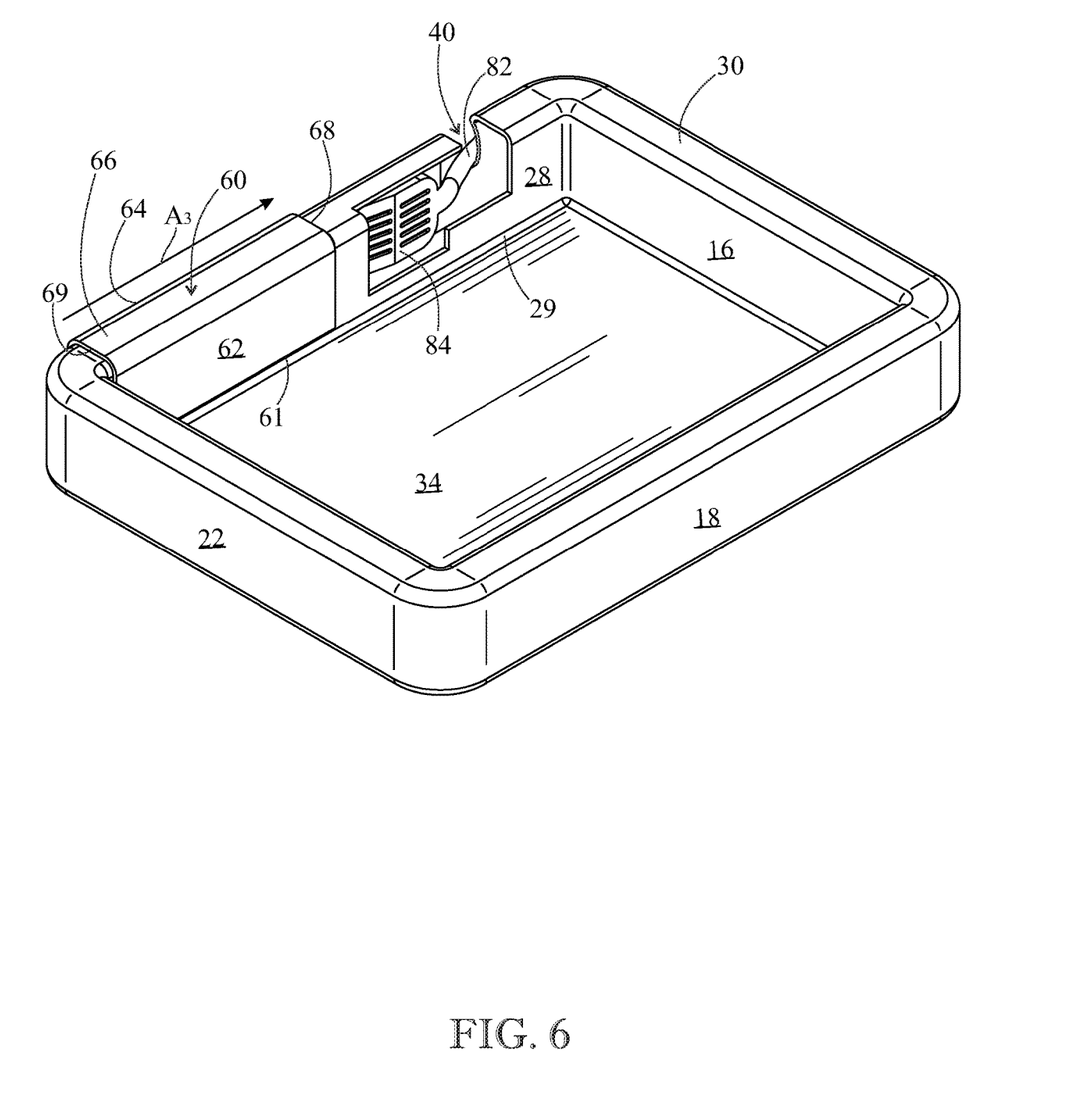
FIG. 6 is top-rear-left isometric view of the animal litter box apparatus as shown in FIG. 5, with arrow A3 illustrating the direction of travel of sliding door (60) from the opened position, shown in FIGS. 1-6, to the closed position, show in FIG. 7-8.
Figure 7:
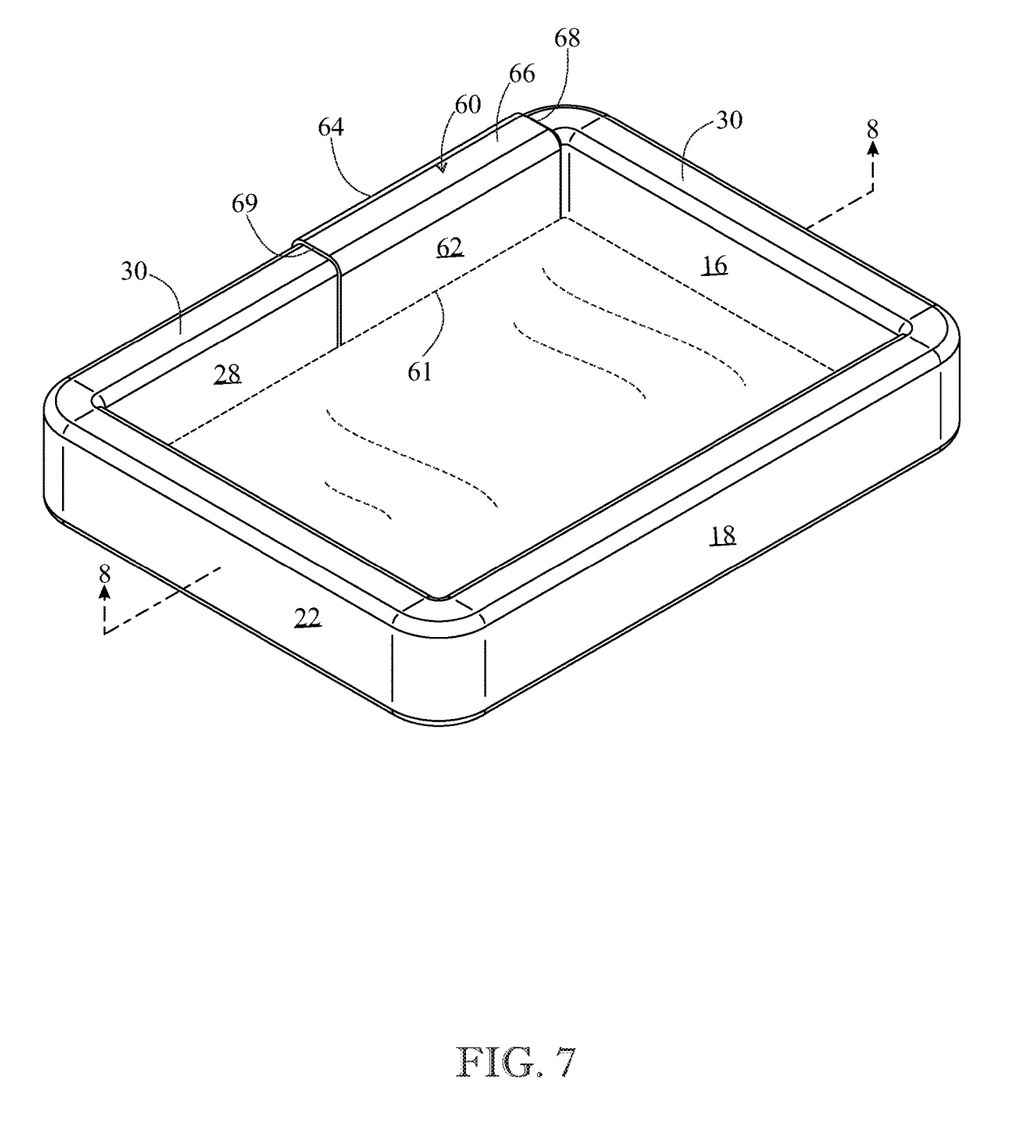
FIG. 7 is a top-rear-left isometric view of the animal litter box apparatus of the present invention shown with the sliding door (62) in a fully-closed position, discreetly storing the litter scoop 80.
Figure 8:
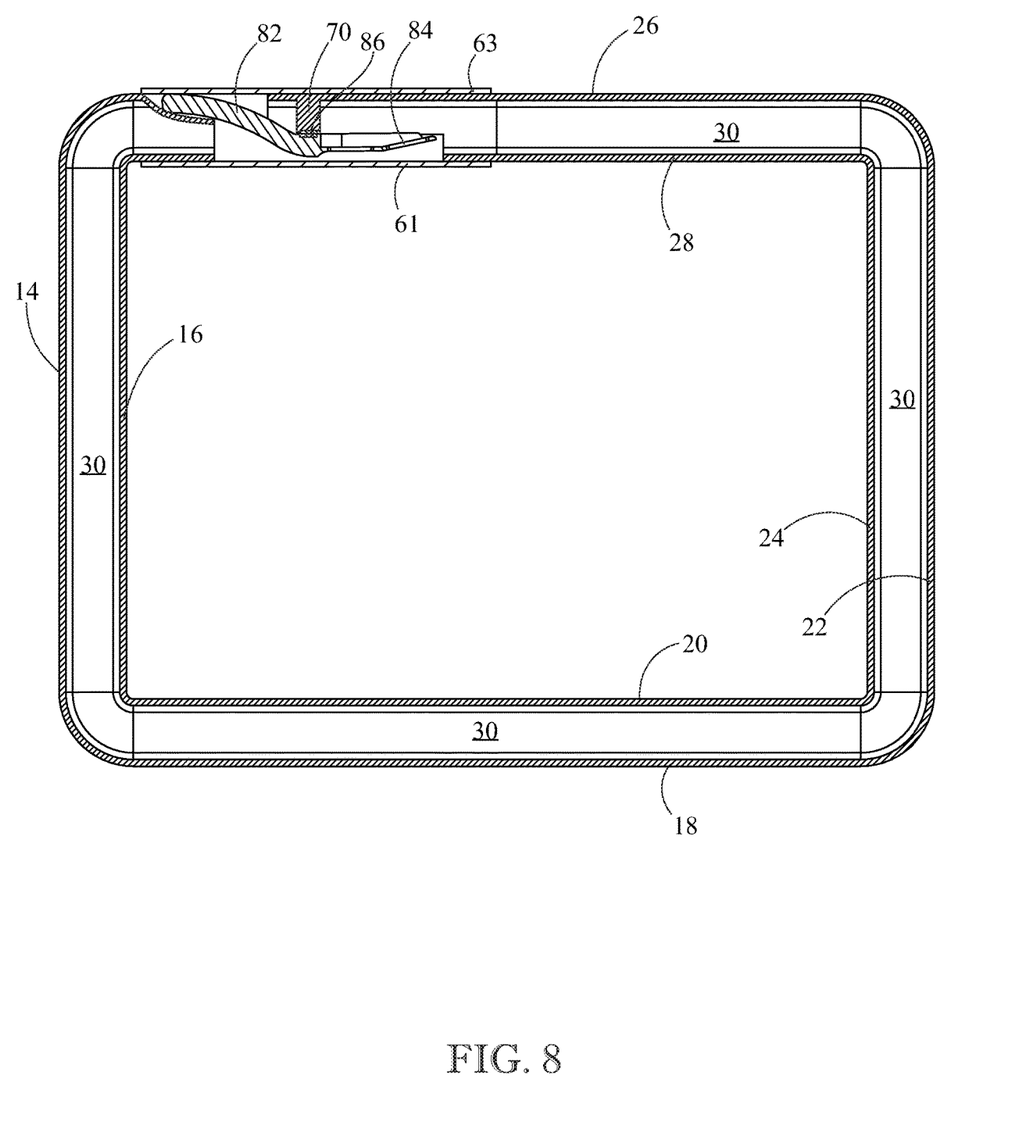
FIG. 8 is a cross-sectional view taken along section lines 8-8 in FIG. 7, clearly illustrating the relative positioning of litter scoop handle (82), litter-sifting scoop basket (84), and litter scoop magnet element (86), with sliding door (60) in a closed position to completely contain the litter scoop.

Referring now particularly to FIGS. 6-8, with the litter scoop 80 properly positioned, cover member 60 may be slidably translated along the front side 27, as depicted by directional arrow $A_3$ (FIG. 6), until leading edge 68 of cover member 60 is either in contact with the exterior surface of interior wall 16 of left side 15, or thereabouts, such that the cover member 60 completely covers the entire compound opening and the entire length of the inwardly-contoured surface, or recess, along with the retained litter scoop handle 82. Significantly, in this closed position any odor emanating from the litter scoop 80, and more particularly the litter-sifting basket 84, is substantially contained within the enclosed interior storage space (as best shown in FIG. 8). Furthermore, in this closed position any undesirable remnants or remains dislodged from sifting basket 84 will fall back into the litter box interior.

Preferably, both animal litter box main body 12 and sliding cover member 60 have a plastic molded construction. By way of example, but not limitation, main body 12 and cover member 60 may be molded using polymers such as polypropylene, high-density polyethylene and polyvinyl-chloride, to name just a few.

Figure 9:
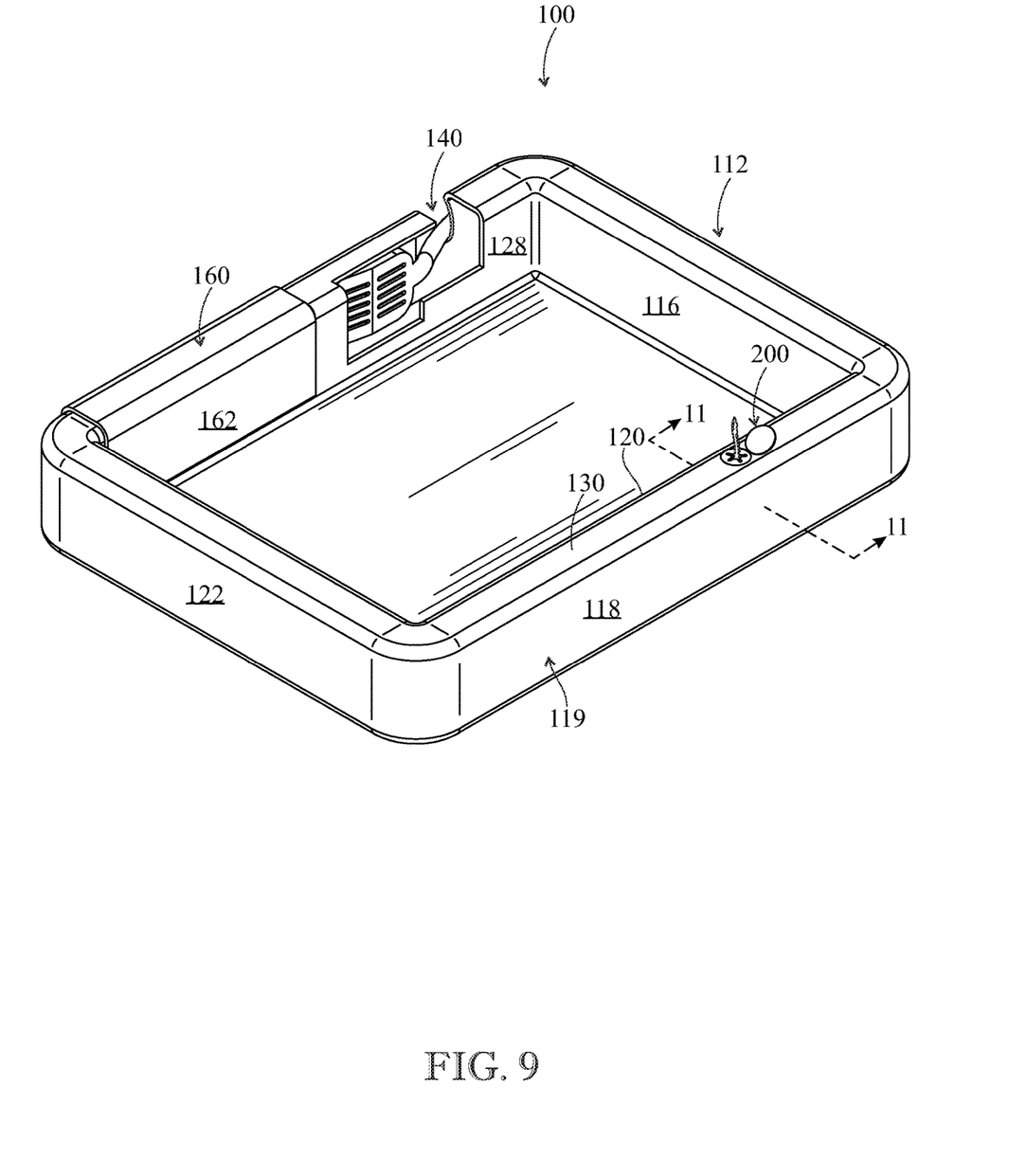
FIG. 9 is a top-rear-left isometric view of an animal litter box apparatus (100), in accordance with an alternate embodiment of the invention incorporating a waste bag-dispensing subassembly 200.
Figure 10:
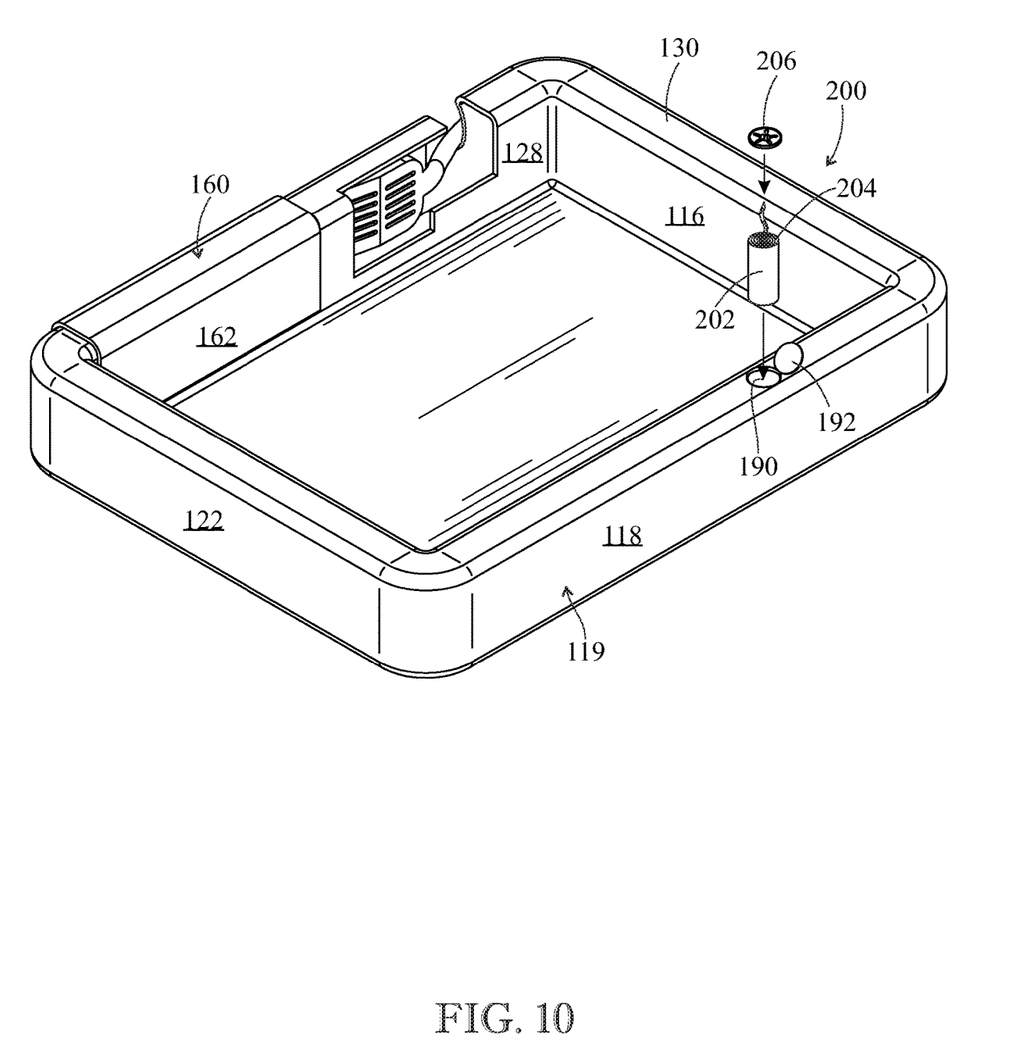
FIG. 10 is a top-rear-left isometric view an animal litter box apparatus (100) as introduced in FIG. 9 with waste bag-dispensing subassembly (200) shown exploded to illustrate individual components thereof.
Figure 11:
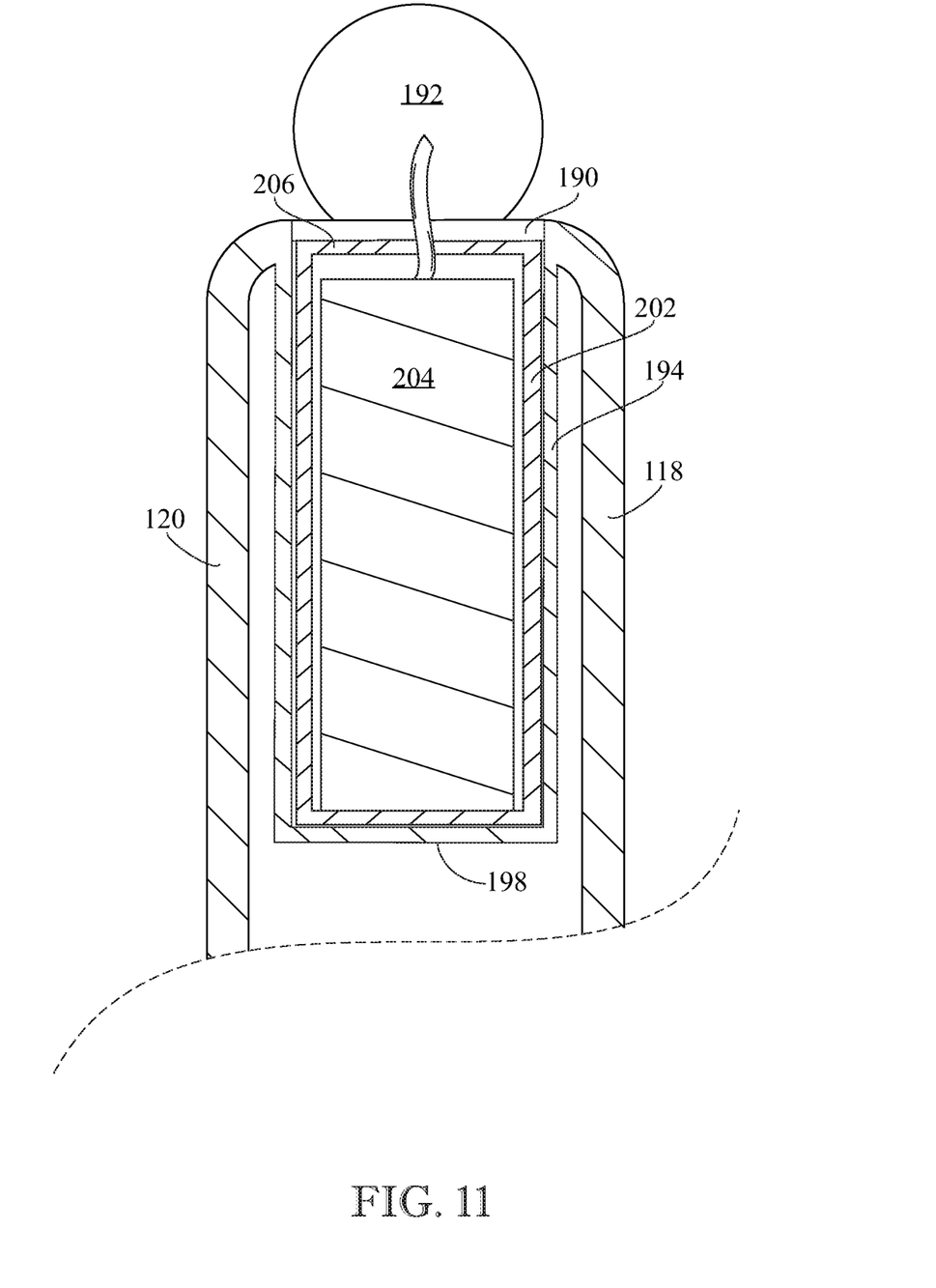
FIG. 11 is a cross-sectional taken along section lines 11-11 in FIG. 9.

Referring now to FIGS. 9-11, in an alternate implementation of the present invention an animal litter box apparatus, shown generally by reference number 100, a secondary auxiliary interior item-dispensing storage space, alternatively referred to herein as a "second interior storage space," may be provided for purposes other than retention of a litter scoop. It should be noted that the individual components and features of animal litter box apparatus 100 corresponding to identical components and features of animal litter box apparatus 10, are identified by identical reference numbers, except that they are preceded by the numeral "1," Thus, for example, cover member 160 shown in FIGS. 9-11 is identical to cover member 60 shown in FIGS. 1-8.

As best shown in FIGS. 10-11, in a preferred exemplary implementation, the auxiliary storage space is particularly sized, shaped and configured for retaining an animal waste bag-dispensing sub-assembly, shown generally by reference numeral 200. In this preferred implementation, sub-assembly 200 is generally comprised of a waste bag container 202, or housing, a contiguous roll of waste bags 204 contained therein, and a dispensing cap 206 configured for withdrawing a single waste bag while leaving the next waste bag (i.e. in the contiguous series of waste bags comprising the waste bag roll) extending partially through the dispensing cap in a position to be easily removed as needed.

In the exemplary implementation shown in FIGS. 9-11, the secondary interior storage space is shown within a rear side 119 of the animal litter box main body 112. An aperture 190, providing access into the interior storage space, is provided extending completely through peripheral upper edge 130, and may include an aperture cover sized and shaped to selectively seal the aperture integrally connected to the peripheral upper edge by a living hinge (not shown). However, any alternate cover structure enabling secure sealing of second interior storage space access aperture 190 may be employed without departing from intended scope of the invention.

Referring now particularly to FIG. 11, an item-dispensing container retaining portion may be integrated directly into the litter box main body 112. In the exemplary structure shown in FIG. 11, the item-dispensing container retaining portion may be comprised of a contiguous side wall 194 conforming to the respective geometry of the item-dispensing container 202. In this manner, a user can easily access the secondary interior storage space, for example, to replace a used item-dispensing container with a new item-dispensing container, etc.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An animal litter box apparatus, comprising:
   a main body including a base and a plurality of sides extending vertically upwards from a periphery of the base, at least one of said plurality of sides having a dual-walled construction at least partially defined by an exterior wall, an interior wall spaced-apart from the exterior wall, and an upper edge adjoining upper ends of the interior and exterior walls, the interior wall, the exterior wall, and the upper edge, together, defining a first interior storage space;
   said at least one side having a compound opening provided therein, said compound opening defined by an exterior wall cut-out, an interior wall cut-out, and an upper edge cut-out adjoining said interior and exterior wall cutouts to form said compound opening;
   a first half of a coupling system extending interiorly from an interior surface of said exterior wall; and
   a unitary cover member disposed about said at least one side, said cover member having spaced-apart exterior and interior vertically-disposed sidewalls adjoined at respective upper ends thereof by, and contiguous with, a cover member top side, said cover member disposed about respective exterior surfaces of said exterior wall, interior wall, and upper edge of said at least one side in such a manner that the cover member is slidably translatable along a length of said at least one side, between an opened position and a closed position, wherein said first interior storage space is accessible when said cover member is in said opened position and said first interior storage space is completely enclosed when said cover member is in said closed position.

2. An animal litter box apparatus as recited in claim 1, further comprising a litter scoop having a handle including a handle length at a proximal end thereof and a litter-sifting basket portion at an opposite distal end thereof, the litter scoop having a second half of said coupling system integrated therewith, the second half of the coupling system releasably attachable to the first half of the coupling system, thereby enabling selective releasable coupling of said litter scoop to the interior surface of the exterior wall of the at least one side.

3. An animal litter box apparatus as recited in claim 2, wherein the first half of the coupling system and the second-half of the coupling system further comprise magnetically-attractable components.

4. An animal litter box apparatus as recited in claim 2, wherein the first half of the coupling system and the second half of the coupling system further comprise at least one of: a mechanical snap-fit coupling system and a hook-and-loop type coupling system.

5. An animal litter box apparatus as recited in claim 2, wherein an exterior surface along a length of the exterior wall of said at least one side further comprises an inwardly-contoured surface portion.

6. An animal litter box apparatus as recited in claim 5, wherein the exterior surface along said length of the exterior wall of said at least one side further comprises a recessed surface portion conforming to an exterior surface of said scoop handle, said recessed surface portion sized, shaped, and configured to receive said handle length such that, upon slidably-closing said unitary cover member, said unitary cover member remains completely unimpeded by said handle length.

7. An animal litter box apparatus as recited in claim 1, wherein said unitary cover member further comprises a mechanism for restricting upward movement of said unitary cover member.

8. An animal litter box apparatus as recited in claim 7, wherein said mechanism for restricting upward movement of said unitary cover further comprises inwardly-projecting features proximate lower ends of said unitary cover interior and exterior sidewalls.

9. An animal litter box apparatus as recited in claim 1, wherein at least two of said plurality of sides have a dual-walled construction at least partially defined by an exterior wall, an interior wall spaced-apart from the exterior wall, and an upper edge adjoining upper ends of the interior and exterior walls, the interior wall, the exterior wall, and the upper edge, together, defining an interior space, at least one of said dual-walled construction sides further comprising:
an aperture extending completely through said upper edge;
a cover sized and shaped to selectively seal said aperture, the cover attached to the upper edge by a living hinge; and
a structure contained within said interior space, said structure depending downwardly from an interior surface of said upper edge to define a secondary interior storage space.

10. An animal litter box apparatus as recited in claim 9, further comprising an item-dispensing container, wherein said second interior storage space is sized and shaped to snugly receive said item-dispensing container therein, and wherein a dispensing top of said item-dispensing container is positioned proximate to said upper edge aperture when said item-dispensing container is fully seated within said second interior storage space.

11. An animal litter box apparatus as recited in claim 10, wherein said item-dispensing container further comprises a waste bag-dispensing container.

12. An animal litter box apparatus as recited in claim 11, said waste bag-dispensing container further comprising:
a cylindrical housing having an interior space;
a compact contiguous roll of waste bags contained within the interior space of said cylindrical housing; and
a dispensing cap seated within an upper opening of said cylindrical housing, said dispensing cap configured to facilitate removal of individual bags of said contiguous roll of waste bags.

13. An animal litter box apparatus configured to discreetly store a litter scoop, the litter scoop including a handle length having a litter-sifting basket at a distal end thereof, the animal litter box apparatus comprising:
a unitary main body including a planar base having a plurality of contiguous sides extending vertically upwards from a periphery of said planar base, a front one of said plurality of contiguous sides having a double-walled construction at least partially defined by an exterior wall, an interior wall inwardly spaced-apart from the exterior wall, and an upper edge contiguous with and adjoining upper ends of the interior and exterior walls, wherein the interior wall, the exterior wall, and the upper edge, together, define a front side interior storage space;
said front side having an integral compound opening providing access to said interior space, the compound opening defined by a respective series of contiguous cut-outs in said exterior wall, upper edge, and interior wall;
a length of said exterior wall, between said exterior wall cut-out and a leftmost end of the exterior wall, having a recessed portion;
a first half of a magnetic coupling system attached to an interior surface of said exterior wall; and
a one-piece inverted U-shaped cover member having a top side adjoining upper ends of a pair of spaced-apart interior and exterior side walls, the spaced-apart sidewalls of said cover member depending downwardly from said top side and terminating at respective interior and exterior side wall bottom ends, the cover member disposed about a corresponding exterior surface of said front side in such a manner that the cover member is slidably translatable along an entire length of said front side between a fully open position wherein said interior storage space is exposed and accessible, and a fully closed position wherein said interior storage space is completely covered and inaccessible.

14. An animal litter box apparatus configured to discreetly store a litter scoop as recited in claim 13, said one-piece inverted U-shaped cover member further covering the recessed portion of said length of said exterior wall in said fully closed position.

15. An animal litter box apparatus as recited in claim 14, further comprising:
a litter scoop including a handle length having a litter-sifting basket at a distal end thereof; and a second half of a magnetic coupling system attached to the litter-sifting basket of the litter scoop in a manner enabling selective magnetic coupling of the litter-sifting basket to said interior surface of said front side exterior wall such that, when magnetically coupled to said interior surface, the litter-sifting basket and a length of said handle extending therefrom are completely contained within said interior space.

16. An animal litter box apparatus as recited in claim 15, wherein the litter scoop handle length includes a proximal end gripping portion, a distal end portion proximate said litter-sifting basket, and an intermediate portion adjoining the proximate and distal end portions, said front side exterior wall recessed portion further comprising a recessed portion surface conforming to an exterior surface of said proximal end gripping portion.

17. An animal litter box apparatus as recited in claim 16, wherein upon sliding said cover member to said fully closed position, the proximal end gripping portion and intermediate portion of said litter scoop handle are completely covered by said front side exterior wall.

18. An animal litter box apparatus as recited in claim 16, said front side exterior wall recessed portion surface sized, shaped, and configured for receiving at least the proximal end gripping portion of said litter scoop handle therein.

19. An animal litter box apparatus as recited in claim 16, said front side exterior wall recessed portion surface sized, shaped, and configured for receiving the proximal end gripping portion and at least a partial length of the intermediate portion of said litter scoop handle therein.

* * * * *